(12) United States Patent
Rentmeester et al.

(10) Patent No.: US 11,998,970 B2
(45) Date of Patent: Jun. 4, 2024

(54) DUAL ACTION RETENTION MECHANISM

(71) Applicant: Milwaukee Electric Tool Corporation, Brookfield, WI (US)

(72) Inventors: Mathew R. Rentmeester, Wauwatosa, WI (US); James G. Ballard, Waukesha, WI (US); Matthew Jensen, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/521,605

(22) Filed: Nov. 8, 2021

(65) Prior Publication Data
US 2022/0143674 A1 May 12, 2022

Related U.S. Application Data

(60) Provisional application No. 63/209,688, filed on Jun. 11, 2021, provisional application No. 63/124,985, (Continued)

(51) Int. Cl.
*B21D 28/34* (2006.01)
*B21D 39/04* (2006.01)
(Continued)

(52) U.S. Cl.
CPC .......... *B21D 28/34* (2013.01); *B21D 39/048* (2013.01); *B25B 27/10* (2013.01); *B30B 15/026* (2013.01)

(58) Field of Classification Search
CPC ...... B21D 39/048; B21D 37/14; B25B 27/10; H01R 43/042; H01R 43/048; B30B 15/026
(Continued)

(56) References Cited

U.S. PATENT DOCUMENTS 2,761,339 A * 9/1956 Lazar .................. H01R 43/042
72/409.16
2,837,135 A * 6/1958 Demler ................ H01R 43/058
72/477
(Continued)

FOREIGN PATENT DOCUMENTS

DE 102009002155 B4 9/2016
DE 102014109162 B4 12/2019
(Continued)

OTHER PUBLICATIONS

WO 2019/245174A; Kwon May 2019.*
CN 108555154 A; Qi et al. Sep. 2018.*

*Primary Examiner* — Edward T Tolan
(74) *Attorney, Agent, or Firm* — Quarles & Brady LLP

(57) ABSTRACT

Embodiments of the invention provide a die retainer for use in a tool. The die retainer can include a ram head, a release button, and a die pin. The ram head includes a die cavity and a pair of lateral sides on opposing sides of the die cavity. The release button can extend through a release button hole formed in the ram head hand include opposing ends that extend past each of the corresponding pair of lateral sides. The die pin extends through a die pin cavity that intersects the release button hole. The die release button can be actuatable from either of the opposing ends to retract the die pin from the die cavity.

12 Claims, 12 Drawing Sheets

Related U.S. Application Data filed on Dec. 14, 2020, provisional application No. 63/110,492, filed on Nov. 6, 2020.

(51) Int. Cl.
  *B25B 27/10* (2006.01)
  *B30B 15/02* (2006.01)

(58) Field of Classification Search
  USPC .............................. 72/409.16, 416, 482.92
  See application file for complete search history.

(56) References Cited

U.S. PATENT DOCUMENTS

| | | |
|---|---|---|
| 4,942,757 A * | 7/1990 | Pecora ............... H01R 43/0427 |
| | | 72/416 |
| 6,324,884 B1 | 12/2001 | Barjesteh et al. |
| 6,619,101 B1 | 9/2003 | Faucher et al. |
| 6,769,173 B2 | 8/2004 | Chadbourne |
| 6,792,789 B1 | 9/2004 | Faucher |
| 7,762,117 B2 | 7/2010 | Faucher et al. |
| 8,074,485 B2 | 12/2011 | College |
| 8,151,618 B2 | 4/2012 | Polofsky |
| 9,444,211 B2 | 9/2016 | Tsai |
| 9,484,700 B2 | 11/2016 | Kehoe |
| 9,660,407 B2 | 5/2017 | Chou |
| 11,394,165 B2 * | 7/2022 | Robicheau ............. B25B 27/026 |
| 2007/0144232 A1* | 6/2007 | Shimota ............... B21D 5/0209 |
| | | 72/481.1 |
| 2016/0329674 A1 | 11/2016 | Ballard et al. |
| 2016/0363510 A1 | 12/2016 | Kanack et al. |
| 2019/0084136 A1 | 3/2019 | Kundracik |

FOREIGN PATENT DOCUMENTS

| | | |
|---|---|---|
| EP | 3100827 A1 | 12/2016 |
| WO | 2019/245174 A1 | 12/2019 |

\* cited by examiner

DUAL ACTION RETENTION MECHANISM

RELATED APPLICATIONS

This application claims priority to U.S. Provisional Patent Application No. 63/110,492, filed on Nov. 6, 2020, U.S. Provisional Patent Application No. 63/124,985, filed on Dec. 14, 2020, and U.S. Provisional Patent Application No. 63/209,688, filed on Jun. 11, 2021, the entireties of which are incorporated herein by reference.

BACKGROUND

Crimpers and cutters often include a crimping or cutting head and certain crimping and cutting features, depending on the particular configuration of the tool. Some crimpers and cutters are hydraulic power tools that include a piston that can exert force on the crimping head, which may be used to move crimping features to perform crimp or compression work at a targeted crimp location. Some crimpers and cutters can include dies that can be secured to the crimping head via a die retention mechanism.

SUMMARY

Embodiments of the invention provide a die retainer for use in a tool. The die retainer includes a ram head that includes a die engagement surface that defines a die cavity and a pair of lateral sides that are on opposing sides of the die cavity. The die retainer includes a release button that extends through a release button hole formed in the ram head. The release button includes a pair of opposing ends that extend past each of the corresponding pair of lateral sides and a slot that extends through the release button. The slot has a first end that defines a notch, and the notch has one or more sloped surfaces. The die retainer includes a die pin that extends through a die pin cavity formed in the die engagement surface and intersects with the release button hole. The die pin includes a button engaging portion that is configured to move along the sloped surface and a die engaging portion that is dimensioned to extend past the die engagement surface into the die cavity to engage the die.

In some embodiments, a dual acting release assembly for use in a die is provided. The dual acting release assembly includes a die release button. The die release button includes a button body having opposing ends each configured to receive an actuating force and a slot that extends through the button body. The slot includes a first end and a second end that defines a notch having opposing ramped surfaces. The dual acting release assembly includes a die pin with a button engaging portion and a die engaging portion. The die pin can be inserted into the notch via the button engaging portion and can be rotated between a locked orientation and an unlocked orientation with respect to the die release button.

Embodiments of the invention provide a die retainer for use in a tool. The die retainer can include a ram head, a release button, and a die pin. The ram head can include a die engagement surface that defines a die cavity, a pair of lateral surfaces on opposing sides of the die cavity, a release button hole, and a die pin cavity that intersects the release button hole. The release button can extend through the release button hole. The release button can include a pair of opposing ends, each one of which extends past one of the pair of lateral surface. The release button includes a slot. The slot can extend between first and second slot ends. The second slot end can define a notch having at least one sloped surface. The die pin can extend through the die pin cavity. The die pin can include a button engaging portion configured to move along the at least one sloped surface of the release button and a die engaging portion that can extend past the die engagement surface of the ram head into the die cavity to retain the die.

In some embodiments, a die retainer can include a die pin that extends through a slot of a release button so that a button engaging portion of the die pin extends past a first slot end in the release button and a die engaging portion of the die pin extends past a second slot end of the release button.

In some embodiments, a die retainer can include a ram head that defines a second die pin cavity. A second die pin can extend through the second die pin cavity into a die cavity of the ram head to retain a die.

In some embodiments, a die retainer can include a second die pin. The second die pin can be a detent member having a detent ball that partially extends into a die cavity of a ram head.

In some embodiments, a die retainer can include a first release button and a second release button that extend through a ram head and beyond each of a pair of opposing lateral surfaces of the ram head.

In some embodiments, a die retainer can include a first bridge element coupled to first and second release buttons and adjacent to a first lateral surface of a ram head and a second bridge element coupled to the first and second release buttons and adjacent to a second lateral surface of a ram head. The first and second lateral surfaces may be on opposite sides of the ram head. Each of the first and second bridge elements can be configured to receive an actuation force to actuate both of the first and second release buttons to thereby release a die from a die cavity of a ram head.

In some embodiments, a die retainer can include a dual acting release button that can be actuated from either side of a ram head to retract a die engaging portion of a die pin from a die cavity of the ram head. The sides of the ram head can correspond to opposing lateral sides of the ram head.

In some embodiments, a die retainer can include a release button having a notch. The notch can include a symmetric profile. The profile may be symmetric about an axis that is perpendicular to an axial direction of the release button.

In some embodiments, a die retainer can include a release button having at least one sloped surface that slopes away from a die cavity of a ram head. The sloped surface can be dimensioned to retract a die engaging portion of a die pin from the die cavity as a button engaging portion of the die pin move toward one side of a symmetric profile that defines the at least one sloped surface. The die pin can be moved along the symmetric profile of the notch in an axial direction of the release button to retract the die pin from the die cavity.

In some embodiments, a die retainer can include a biasing element, such as a spring, for example. The spring can be seated within the pin cavity between an internal wall of a ram head and a button engaging portion of a die pin.

In some embodiments, a die retainer can include a die pin having a button engaging portion. The button engaging portion can include a stepped profile that is dimensioned to slidably secure the die pin within a slot of a release button.

Some embodiments of the invention provide a dual acting release assembly for use with a die. The dual acting release assembly can include a die release button and a die pin. The die release button can include a button body having opposing ends, each configured to receive an actuating force. The button body can define a slot that extends through the button body between a first slot end and a second slot end. The second slot end can define a notch within the button body having opposing ramped surfaces. The die pin can include a button engaging portion and a die engaging portion opposite the button engaging portion. The die pin can be inserted into the slot at the first slot end via the button engaging portion of the die pin and can be moved between a retention orientation and release orientation. The retention orientation can correspond to the dual acting release assembly securing a die within a ram head and the release orientation can correspond to the dual acting release assembly allowing a die to be moved in and out of the die cavity of the ram head.

In some embodiments, a dual acting release assembly can include a biasing element that biases a die pin toward a center of the notch in an axial direction of a die release button. Additionally, the biasing element can bias the die pin in a retention orientation.

In some embodiments, a dual acting release assembly can include a biasing element that urges a die engaging portion of a die pin away from a button body of a release button.

In some embodiments, a dual acting release assembly can include a detent member configured to provide a first locking engagement with a die and a die pin configured to provide a second locking engagement with the die.

In some embodiments, a dual acting release assembly can include a release button having a slot. The slot can include a first slot end that defines a rectangular profile. The rectangular profile can be dimensioned to receive a button engaging portion of a die pin when the die pin is in a first orientation, and dimensioned to block movement of the button engagement portion through the slot when the die pin is in a second orientation. To move the die pin from the first orientation to the second orientation, the die pin can be rotated about a longitudinal axis approximately 90 degrees.

In some embodiments, a dual acting release assembly can include a release button having a slot with opposing ramped surfaces. The ramped surfaces can provide a generally V-shaped profile within a button body of the release button.

Some embodiments of the invention provide a method of assembling a release mechanism for a die retainer. The method can include aligning a button engaging portion of a die pin with a first end of a slot extending through the die release button. The method can include inserting the die pin into the release button so that the button engaging portion extends beyond a second end of the slot of the die release button and a die engaging portion of the die pin extends beyond the first end of the slot of the die release button. The method can include rotating the die pin approximately 90 degrees (e.g., between 75 and 105 degrees) to secure the die pin within the slot of the die release button.

In some embodiments, a method of assembling a release mechanism for a die retainer can include inserting a die release button into a through hole of a ram head body and inserting a button engaging portion of a die pin into a die pin cavity of the ram head body.

In some embodiments, a method of assembling a release mechanism for a die retainer can include inserting a spring into a die pin cavity of a ram head body.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
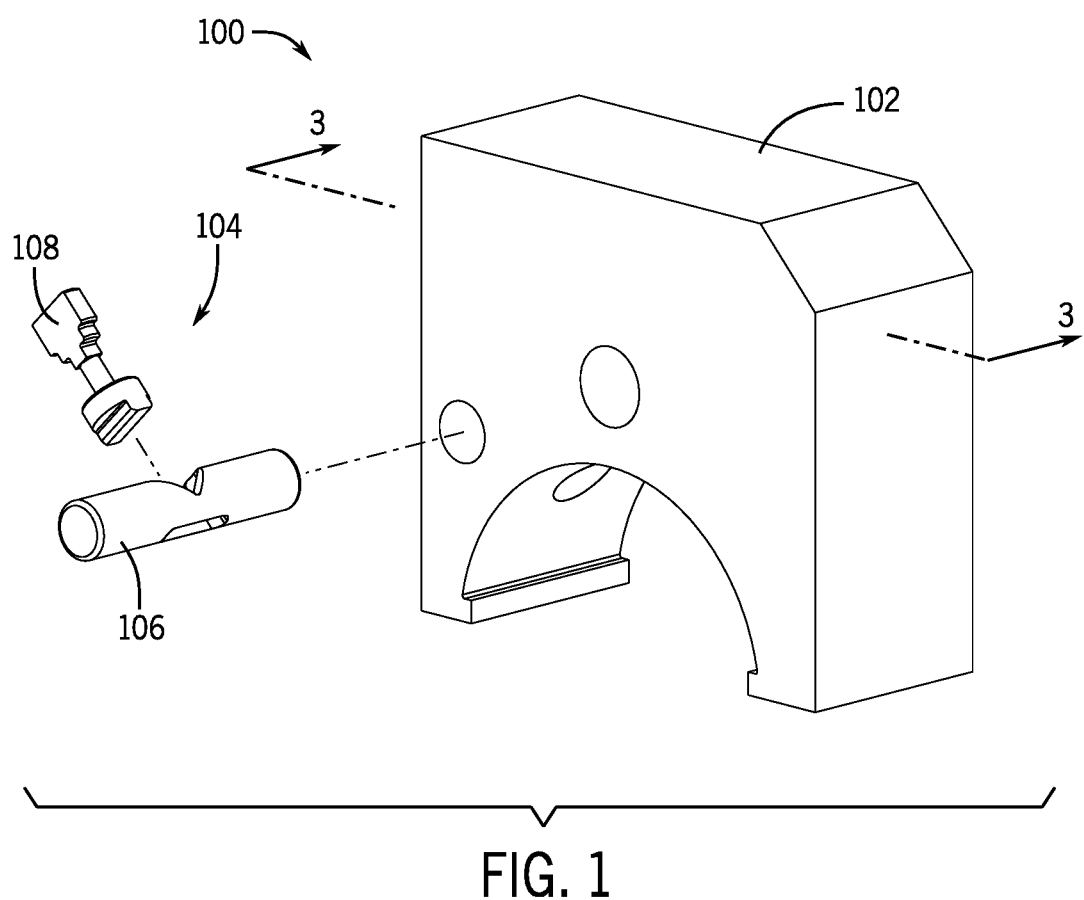
FIG. 1 is an exploded isometric view of a die retainer including a ram head and a release assembly according to one embodiment of the invention.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

A die retainer for use with a crimping and cutting tool is described below. Some crimpers include a ram head or die securing portion that is used to secure a die, such as a crimping die, that can be used to create a certain size indent on a certain type of crimp operation. It can generally be useful to have a die retention mechanism that allows a die to be easily removed from a crimping head. Easy removal can include a single motion required to release the die, or a dual acting release mechanism that can be actuated on either of opposing sides of a crimping head.

FIG. 1 illustrates a die retainer 100 according to one embodiment of the invention. In some embodiments, the die retainer 100 may be used with a hydraulic hand tool. For example, the die retainer 100 may be used with a utility crimper. As shown in FIG. 1, the die retainer 100 includes a ram head 102 and a release assembly 104. The release assembly 104 includes a die release button 106 and a die pin 108.

Figure 2:
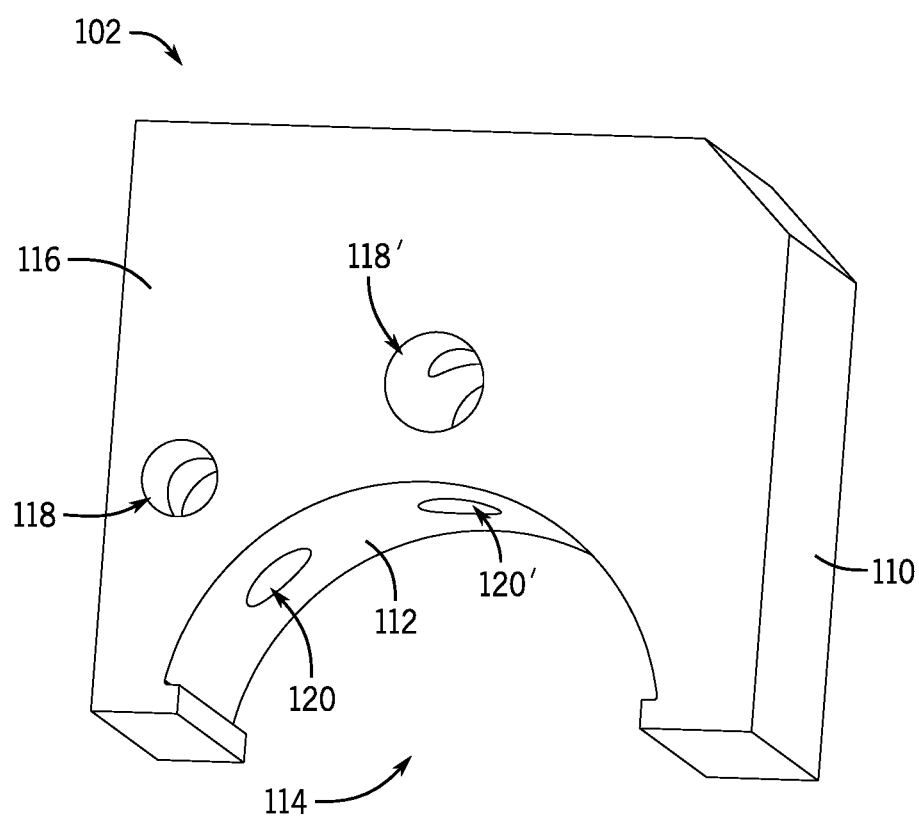
FIG. 2 is an isometric view of the ram head of FIG. 1.

FIG. 2 illustrates the ram head 102 of FIG. 1. The ram head 102 includes a ram head body 110. The ram head body 110 includes a die engagement surface 112 that defines a die cavity 114 and lateral surfaces 116 (only a single lateral surface 116 is visible in FIG. 1) that extend along opposing sides of the ram head 102. The ram head body 110 also includes a through hole or release button hole 118 and a die pin cavity 120. In the illustrated embodiment, the ram head body 110 also includes a though hole 118' and a pin cavity 120'. The through hole 118' is substantially similar to the through hole 118 and the pin cavity 120' is substantially similar to the cavity 120. Therefore, the structure of the through hole 118' and the pin cavity 120' will not be described in detail.

Figure 8:
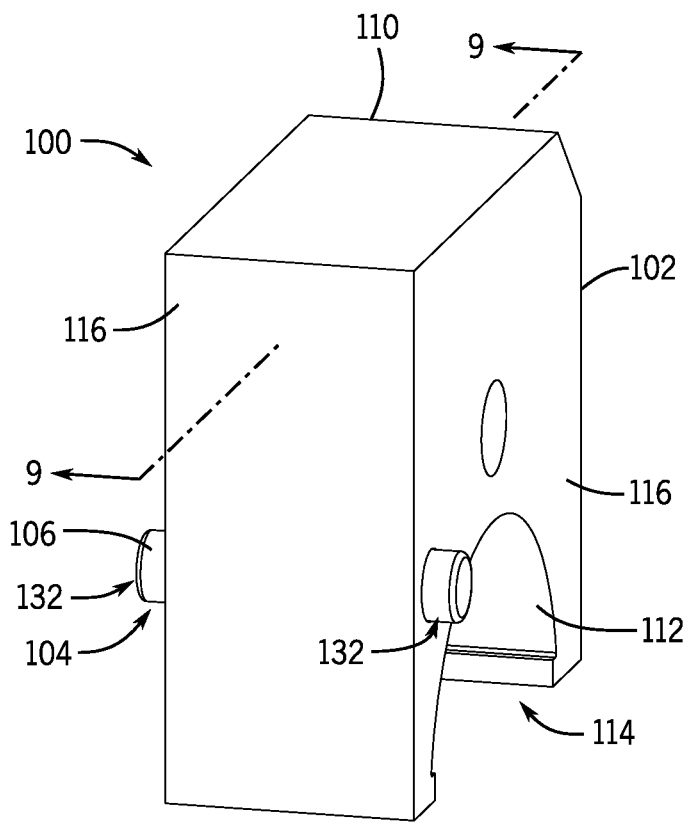
FIG. 8 is an isometric view of the die retainer of FIG. 1.
Figure 9:
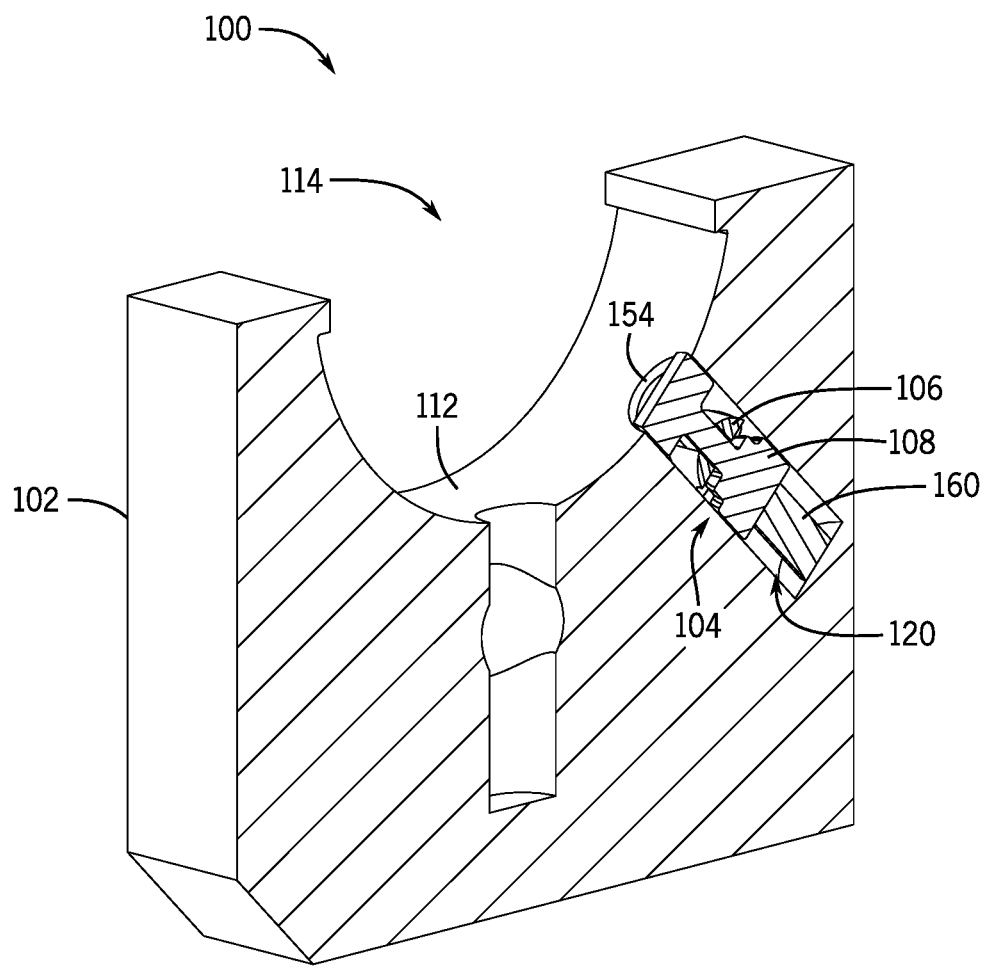
FIG. 9 is a cross-sectional isometric view of the die retainer taken through line 9-9 of FIG. 8.

In general, the through hole 118' and the pin cavity 120' provide an alternate location for the release assembly 104 with respect to the ram head 102 compared with the through hole 118 and the pin cavity 120. Although FIGS. 1, 8, and 9 illustrate the release assembly 104 in alignment with the through hole 118 and the pin cavity 120, in other embodiments, the release assembly 104 can be similarly assembled in the through hole 118' and the pin cavity 120' and operated by a similar means. Some embodiments of the ram head 102 can include more or fewer combinations of through holes and pin cavities than the illustrated embodiment.

Figure 3:
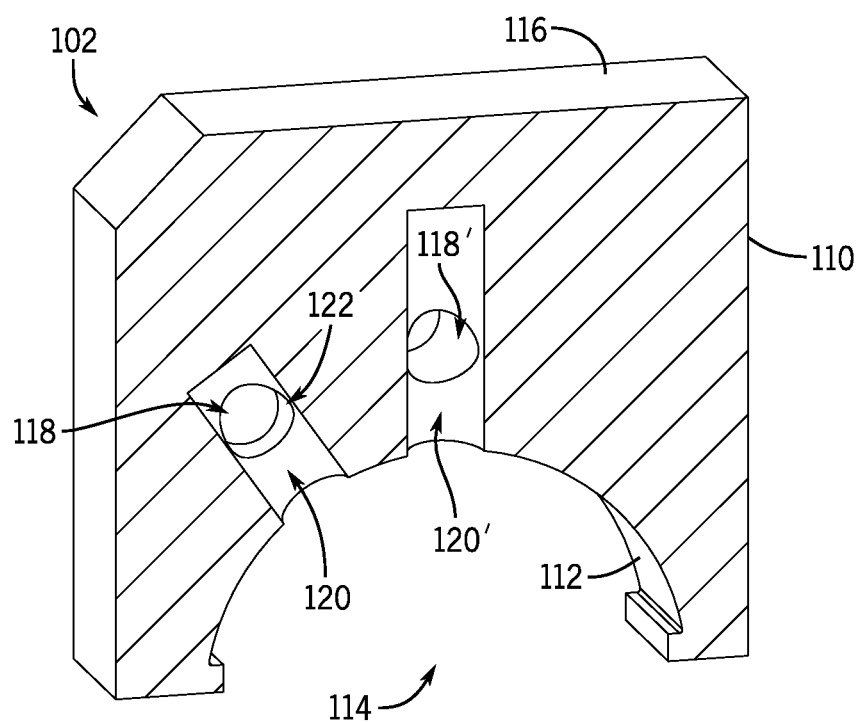
FIG. 3 is a cross-sectional isometric view of the ram head taken through line 3-3 of FIG. 1.

As illustrated in FIG. 3, the through hole 118 extends through the ram head body 110 between the lateral surfaces 116. The pin cavity 120 is formed in the die engagement surface 112 and extends into the ram head body 110. The pin cavity 120 also extends through the through hole 118 to create an intersection 122. The pin cavity 120 is formed generally perpendicular to the through hole 118 and extends beyond the through hole 118 to provide space for a biasing element, such as a spring, for example (see FIG. 9).

Figure 4:
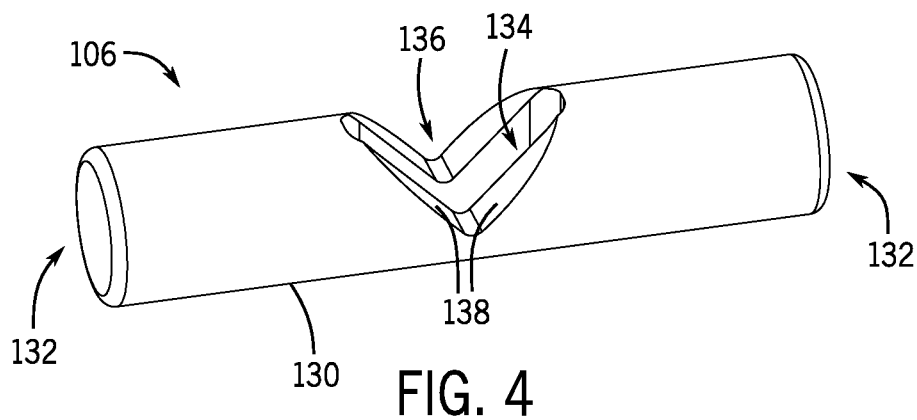
FIG. 4 is an isometric view of a die release button of the release assembly of FIG. 1.

FIG. 4 illustrates the die release button 106 of the release assembly 104 of FIG. 1. The die release button 106 includes a button body 130 having opposing ends 132 and a slot 134. The slot 134 extends through the button body 130 in a direction perpendicular to an axis that extends between the opposing ends 132. The slot 134 defines opposing slot ends, the slot 134 extending between the slot ends perpendicular to the axial direction of the release button 106. In the illustrated embodiment, one of the opposing slot ends of the slot 134 is defined by a rectangular profile (see, for example, FIG. 1) and the other opposing slot end of the slot 134 includes a notch 136 that is symmetric and generally has V-shaped or otherwise symmetric profile. The notch 136 includes sloped surfaces 138 that form a cutout in the button body 130. The sloped surface 138 are generally sloped away from the die cavity 114. The V-shaped profile can allow the die release button 106 to be actuated in a first or a second direction to move (e.g., retract) the die pin 108 out of engagement with a die, the first and second directions opposite one another.

In the illustrated embodiment, the sloped surfaces 138 of the notch 136 are symmetrical so that actuation of the die release button 106 in either of the first or second directions each provide a similar release mechanism. However, in other embodiments, one of the sloped surface 138 can be steeper than the other sloped surface 138 so that actuation in the first direction moves the die pin 108 a first distance out of engagement with a die and actuation in the second direction moves the die pin 108 a different, second distance out of engagement with a die.

In other embodiments, a die release button for a release assembly can include features that interact with a die pin to operably move the die pin in and out of engagement with a die. Such features of the die release button can include, for example, ramped, curved, angled, or protruding surfaces that engage the die pin and urge the die pin out of engagement with the die when the die release button is actuated. Additionally, in other embodiments, a die release button for a release assembly can include an actuation portion to facilitate (e.g., increase surface area at an opposing end of the die release button) to actuate the die release button (see, for example, FIG. 13).

Figure 5:
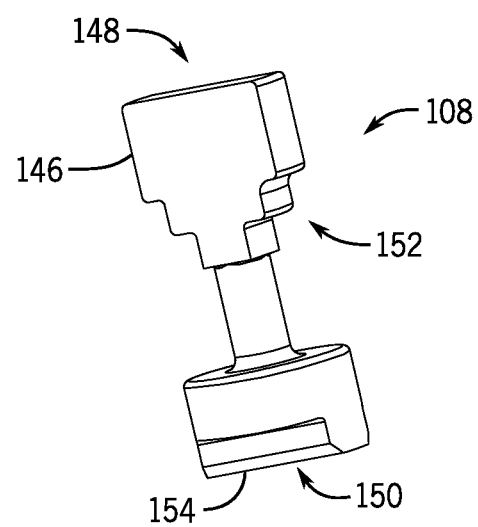
FIG. 5 is an isometric view of a die pin of the release assembly of FIG. 1.

FIG. 5 illustrates the die pin 108 of the release assembly 104 of FIG. 1. The die pin 108 includes a pin body 146. The pin body 146 includes a button engaging portion 148 and a die engaging portion 150. The button engaging portion 148 includes a generally rectangular profile that is dimensioned to be received by the slot 134 of the die release button 106 and a square key 152 having a square perimeter that is configured to engage the notch 136 and slide along the sloped surfaces 138 of the die release button 106. In the illustrated embodiment, the square key 152 includes a stepped profile. In other embodiments, the square key 152 can include a single step configured as a shoulder. The stepped profile can provide a smooth or contact surface for the button engaging portion 148 to slide along the sloped surfaces 138 of the die release button 106 while centering the die pin 108 within the slot 134. The stepped portion can also prohibit the button engaging portion 148 from disengaging with the slot 134 when in an assembled configuration.

The die engaging portion 150 also includes a retention feature 154. In the illustrated embodiment, the retention feature 154 is configured as a rectangular protrusion extending from the pin body 146 opposite the button engaging portion 148. The retention feature 154 is generally dimensioned to engage and retain a die within the ram head 102. The retention feature 154 can provide a catch within the die cavity 114 of the ram head 102 to retain a die. When the die engaging portion 150, and thus the retention feature 154, is retracted from the die cavity 114, a die can be slid or otherwise moved in and out of the die cavity 114 for installation or removal of a die.

Figure 6C:
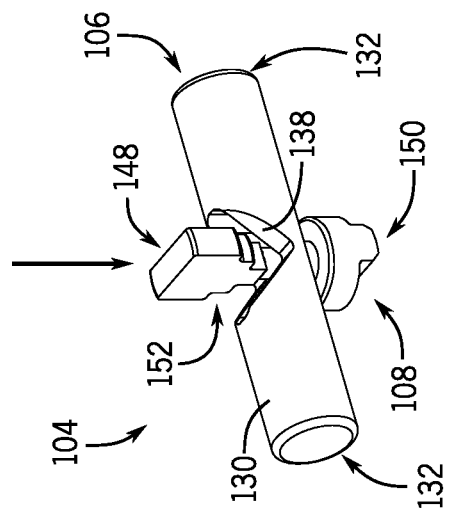
FIG. 6C is an isometric view of the release assembly of FIG. 1 in an assembled configuration.
Figure 6B:
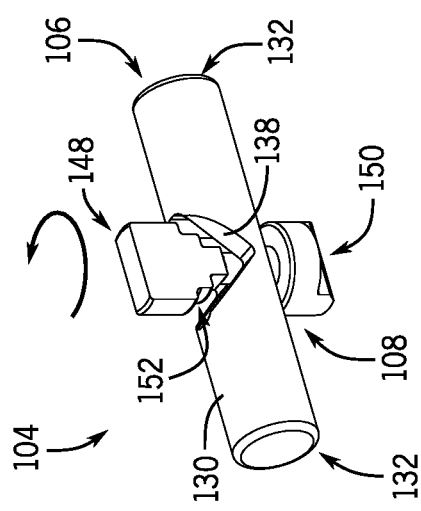
FIG. 6B is an isometric view of the release assembly of FIG. 1 in a partially assembled configuration.
Figure 6A:
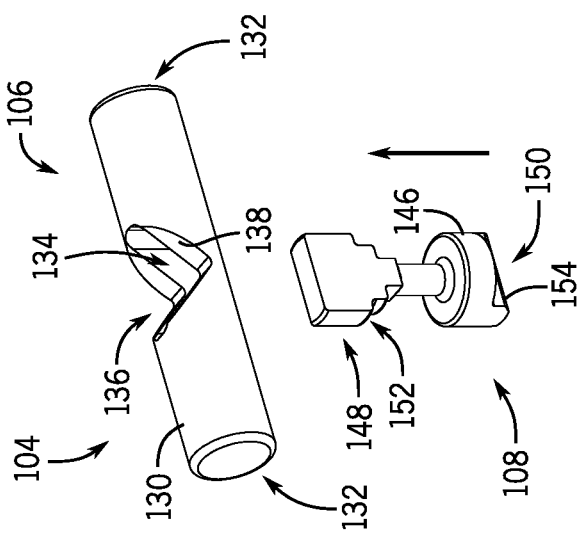
FIG. 6A is an isometric view of the release assembly of FIG. 1 in a preassembled configuration.

FIGS. 6A-6C illustrate an example of an assembly of the release assembly 104 of FIG. 1. Illustrated in FIG. 6A, the die pin 108 can be inserted into the slot 134 of the die release button 106. The button engaging portion 148, which includes a rectangular profile, can be aligned with and inserted into the rectangular profile of the slot 134. The die pin 108 can be moved through the slot 134 in the direction indicated in FIG. 6A. As illustrated in FIG. 6B, when the button engaging portion 148 of the die pin 108 has been suitably extended beyond the notch 136 (e.g., the stepped profile is extended beyond the sloped surfaces 138 through the slot 134) of the die release button 106, the die pin 108 can be rotated approximately 90 degrees in the direction indicated in FIG. 6B (the die pin 108 can also be rotated in the opposing direction).

As illustrated in FIG. 6C, once the die pin 108 is rotated in a direction approximately 90 degrees from the insertion orientation, the square key 152 of the die pin 108 can engage the sloped surface 138 to secure the die pin 108 in the slot 134 of the die release button 106. The die pin 108 is biased toward the die release button 106 in the direction indicated in FIG. 6C by a biasing element. The force of the biasing element, such as a spring, for example, pushes the die pin 108 into the notch 136 which corresponds to the die engaging portion 150 of the die pin 108 extending into the die cavity 114. When the die engaging portion 150 extends into the die cavity 114 (see, for example, FIG. 9), the retention feature 154 can engage with a die to secure the die to the ram head 102.

Figure 7:
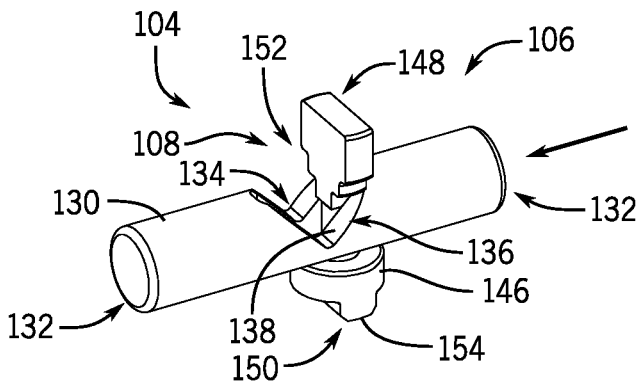
FIG. 7 is an isometric view of the release assembly of FIG. 1 with an activation force applied to a first side of the die release button.

FIG. 7 illustrates an actuation force acting on the release assembly 104. The actuation force is acting in the direction indicated in FIG. 7, however, an actuation force can similarly act on the opposing end 132 of the die release button 106. In particular, the actuation force is acting at one of the opposing ends 132 of the die release button 106. As the die release button 106 is pushed and moved relative to the ram head 102, the square key 152 of the die pin 108 is urged up (relative to the orientation shown in FIG. 7) along the sloped surface 138 toward the outer surface of the die release button 106. When the square key 152 of the die pin 108 is moved along either side of the notch 136 via the sloped surfaces 138, the die engaging portion 150 is moved closer to the button body 130 of the die release button 106. FIG. 7 illustrates the release assembly 104 in an orientation that corresponds to a release orientation. In particular, FIG. 7 illustrates the release assembly 104 in one of two possible release orientations.

Applying an actuation force to the die release button 106 can move the die pin 108 from a retention orientation to the release orientation (i.e., the neutral orientation is the retention orientation). Applying an actuation force corresponds with the die engaging portion 150 of the die pin 108 retracting from the die cavity 114. When the die engaging portion 150 retracts from the die cavity 114, the retention feature 154 can disengage from a die so that a die can be removed from the die cavity 114. Similarly, when the die engaging portion 150 retracts from the die cavity 114, a die can be inserted into the die cavity. Once a die is inserted into the die cavity 114, the die released button 106 can be released (back to the neutral position) so that the button engaging portion 148 of the die pin 108 can return to the center of the notch 136 of the die release button 106 and the die engaging portion 150 can once again extend into the die cavity 114 to engage and secure the die.

Although FIG. 7 illustrates an actuation force acting in a first direction at one of the opposing ends 132 of the die release button 106, an actuation force can act at the other opposing end 132 of the die release button 106 in a direction opposite to the direction indicated in FIG. 7. For example, FIG. 8 illustrates the release assembly 104 installed in the ram head 102. As shown, the die release button 106 extends through the through hole 118 so that each of the opposing ends 132 of the die release button 106 extend beyond the corresponding lateral surfaces 116 of the ram head 102. Since the die release button 106 extends on both sides of the ram head 102, the release assembly 104 is advantageously dual acting and can be actuated from either side of the ram head 102. The dual acting capability allows for a user to easily disengage a die from the ram head 102 in a number of orientations depending on the user's relative position to the die head 102 or hand placement. For example, the dual acting capability can facilitate right-handed and left-handed use.

FIG. 9 illustrates the die retainer 100 with the release assembly 104 in the retention orientation (e.g., neutral orientation). In the retention orientation, a biasing member 160 biases the release assembly 104 in the retention orientation until an actuation force applied to the die release button 106 overcomes the force applied by the biasing member 160 to move the button engaging portion 148 of the die pin 108 along the notch 136 to retract the die engaging portion 150 from the die cavity 114. As described above, the actuation force can be applied to one of the opposing ends 132 of the die release button 106.

Figure 10:
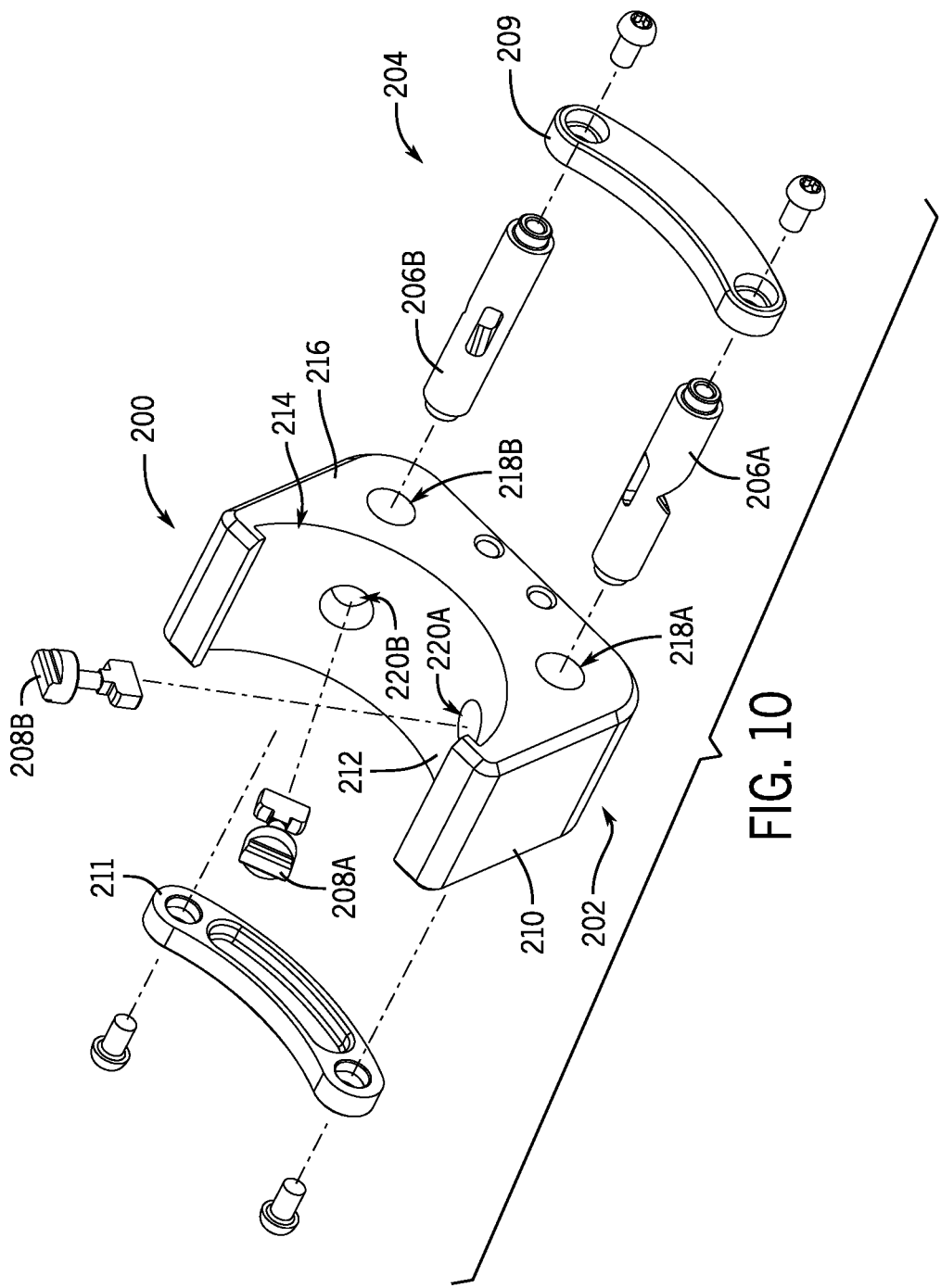
FIG. 10 is an exploded isometric view of a die retainer including a ram head and a release assembly according to another embodiment of the invention.

FIG. 10 illustrates a die retainer 200 according to another embodiment of the invention. Similar to the die retainer 100, the die retainer 200 may be used with a hydraulic hand tool. For example, the die retainer 200 may be used with a utility crimper. As shown in FIG. 10, the die retainer 200 includes a ram head 202 and a release assembly 204. The release assembly 204 includes first and second die release buttons 206A, 206B, first and second die pins 208A, 208B, and first and second bridge elements 209, 211.

Similar to the ram head 102, the ram head 202 includes a ram head body 210. The ram head body 210 includes a die engagement surface 212 that defines a die cavity 214 and lateral surfaces 216 (only a single lateral surface 216 is visible in FIG. 10) that extend along opposing sides of the ram head 202. The ram head body 210 also includes first and second through holes configured as first and second release button holes 218A, 218B. The ram head body 210 also includes first and second die pin cavities 220A, 220B. The release button holes 218A, 218B and the die pin cavities 220A, 220B are substantially similar to the through hole 118 and the pin cavity 120, respectively, therefore the structures of such will not be described in detail.

Figure 11:
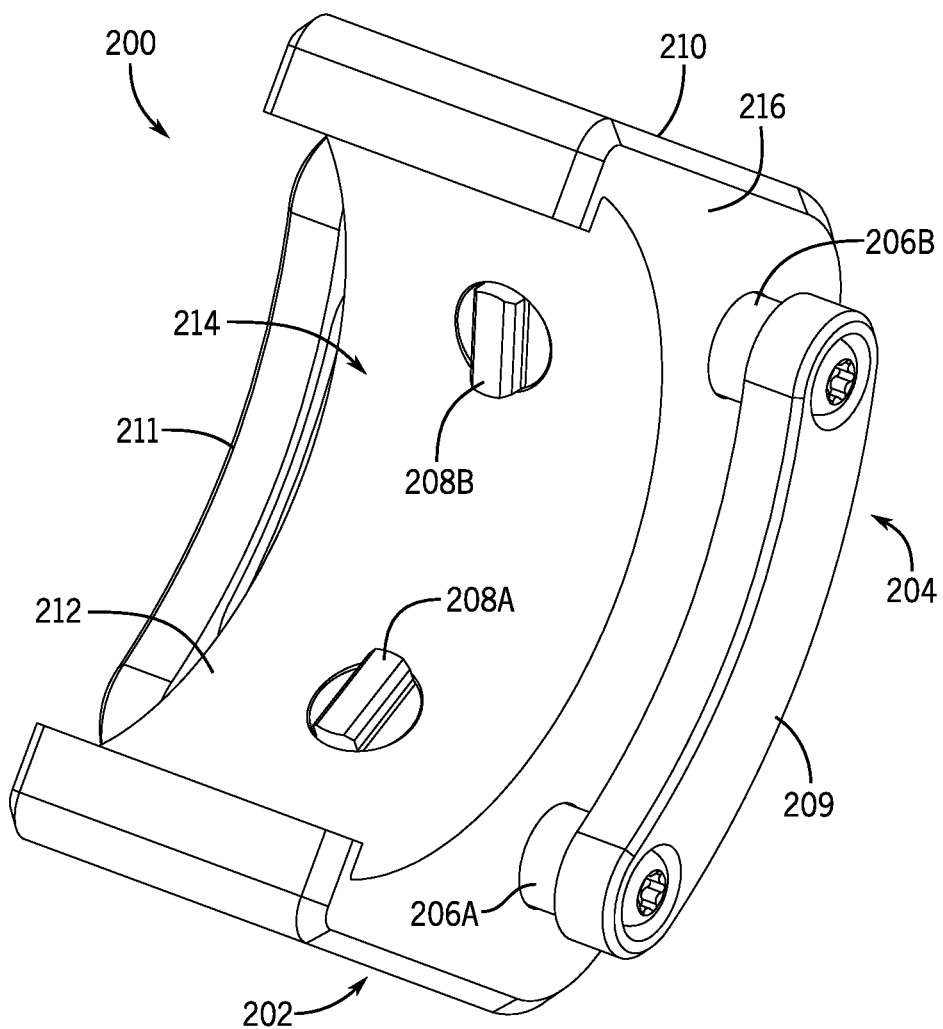
FIG. 11 is an isometric view of the die retainer of FIG. 10.

In general, each of the release buttons 206A, 206B and the die pins 208A, 208B interact with each other and a die (not shown) in a substantially similar manner as the release button 106 and the die pin 108. As illustrated in FIG. 11, each of the bridge elements 209, 211 extend between corresponding opposing ends of each of the release buttons 206A, 206B. In the illustrated embodiment, the bridge elements 209, 211 are secured to the release buttons 206A, 206B via screws. However, in some embodiments other fasteners such as pins, clips, adhesives, etc. may be used to secure the bridge elements 209, 211 to the release buttons 206A, 206B.

Each bridge element 209, 211 provides an independent actuation element so that both release buttons 206A, 206B can be actuated at the same time proximate to either lateral surface 216 of the ram head 202. As briefly discussed above, generally the die retainer 200 operates similarly to the die retainer 100 with an additional die engaging portion provided by the combination of the first and second die pins 208A, 208B. In general, each bridge element 209, 211 allows for an increased holding force provided by the arrangement of the release buttons 206A, 206B and the die pins 208A, 208B. Additionally, and advantageously, the bridge elements 209, 211 can provide a wide release surface to operate the release assembly 204. For example, each of the die pins 208A, 208B can be retracted from the die cavity 214 by pressing, with an actuation force to overcome a biasing force of the release assembly 204, anywhere along either of the bridge elements 209, 211 between the release buttons 206A, 206B in a direction toward the ram head body 210.

FIGS. 12-15 illustrate a die retainer 300 according to another embodiment of the invention. The die retainer 300 is generally similar in structure and operation to the die retainer 100 and the die retainer 200, so discussion of the die retainer 300 generally also applies to the die retainers 100 and 200, and vice versa. However, in some regards the die retainer 300 differs from the die retainers 100 and 200, including as further discussed below.

Figure 12:
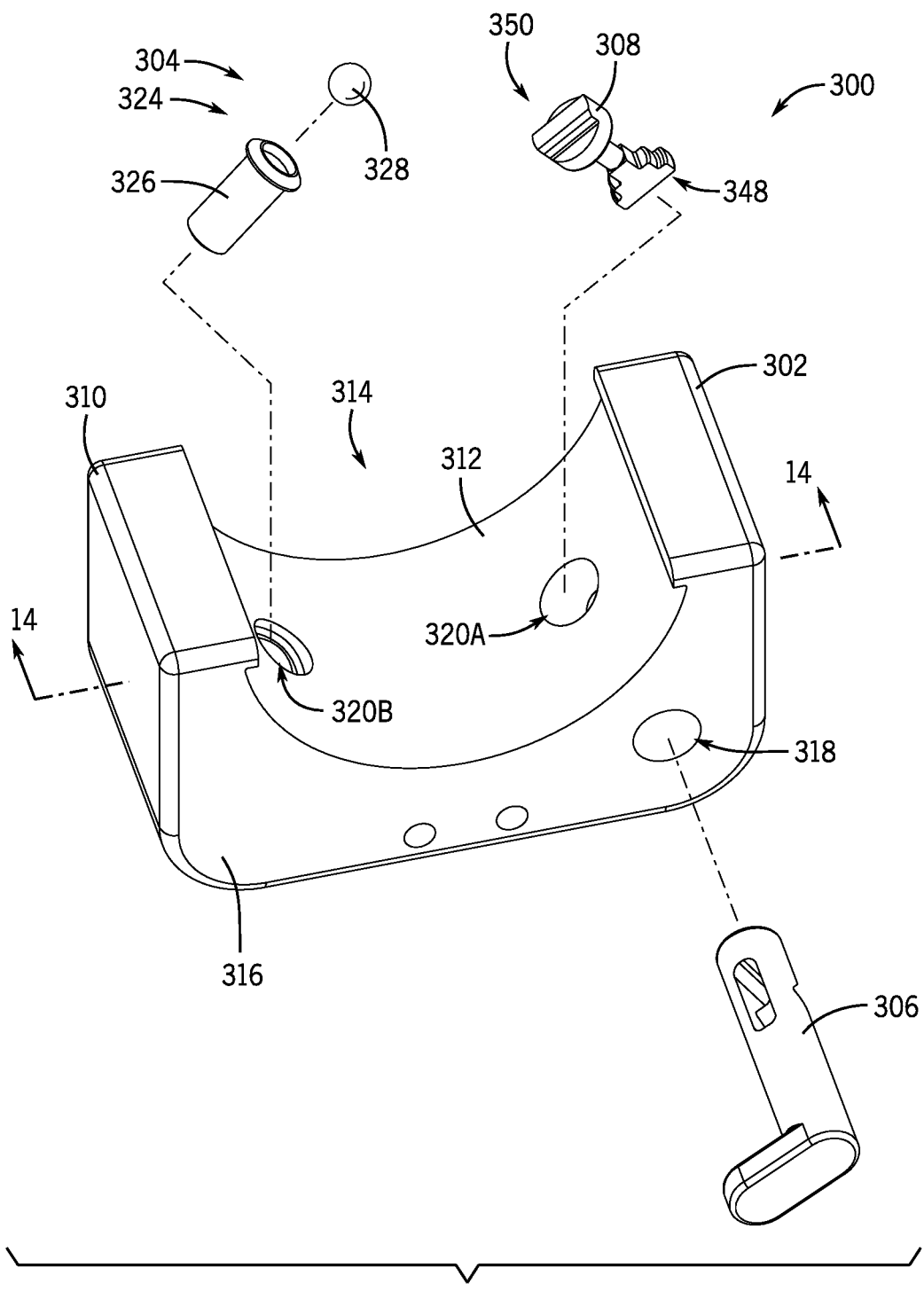
FIG. 12 is an exploded isometric view of a die retainer including a ram head and a release assembly according to another embodiment of the invention.

Similar to the die retainer 100 and the die retainer 200, the die retainer 300 may be used with a hydraulic hand tool. For example, the die retainer 300 may be used with a utility crimper. As shown in FIG. 12, the die retainer 300 includes a ram head 302 and a release assembly 304. The release assembly 304 includes a die release button 306 and a die pin 308. Additionally, in the illustrated embodiment, the release assembly 304 can also include a detent member 324.

Similar to the ram head 102 and the ram head 202, the ram head 302 includes a ram head body 310. The ram head body 310 includes a die engagement surface 312 which defines a die cavity 314. The ram head body 310 further includes a pair of lateral surface 316 (though only a single lateral surface 316 is visible in FIG. 12) that extend along opposing sides of the ram head 302. The ram head body 310 also includes first and second pin cavities 320A, 320B formed in the die engagement surface 312 of the ram head 302. Additionally, similar to the ram head 102, the ram head 302 includes a release button hole 318 that intersects the first pin cavity 320A within the ram head body 310.

In general, the method of installing and operating the release assembly 304 of the die retainer 300 is substantially similar to the release assembly 104 and the release assembly 204. For example, in use, an actuating force can act on the die release button 306 (e.g., in an axial direction relative to the die release button 306) to disengage a die from the ram head 302 via the release assembly 304. As the die release button 306 is pushed and moved relative to the ram head 302, a button engaging portion 348 of the die pin 308 is moved along a sloped surface 338 of the die release button 306 to move a die engaging portion 350 away from the die engagement surface 312. In the illustrated embodiment, the die pin 308 can be substantially similar to any of die pins 108, 208A, and 208B.

Figure 13:
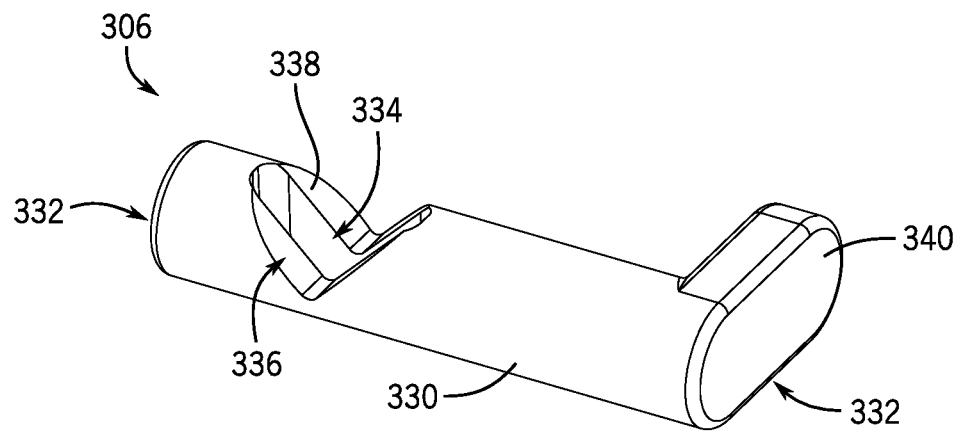
FIG. 13 is an isometric view of a die release button of the release assembly of FIG. 12.

With reference to FIG. 13, the die release button 306, similar to the die release button 106, includes a button body 330 having opposing ends 332. The button body 330 defines a slot 334 extending through the button body 330 adjacent to a notch 336 that is defined by a set of sloped surfaces 338. In the illustrated embodiment, the die release button 306 includes an actuation portion 340 disposed at one of the opposing ends 332. The actuation portion 340 forms a surface that extends in a non-axial (e.g., perpendicular) direction from the button body 330. The actuation portion 340 is configured to extend outside of the ram head body 310 adjacent to one of the lateral surfaces 316.

Figure 14:
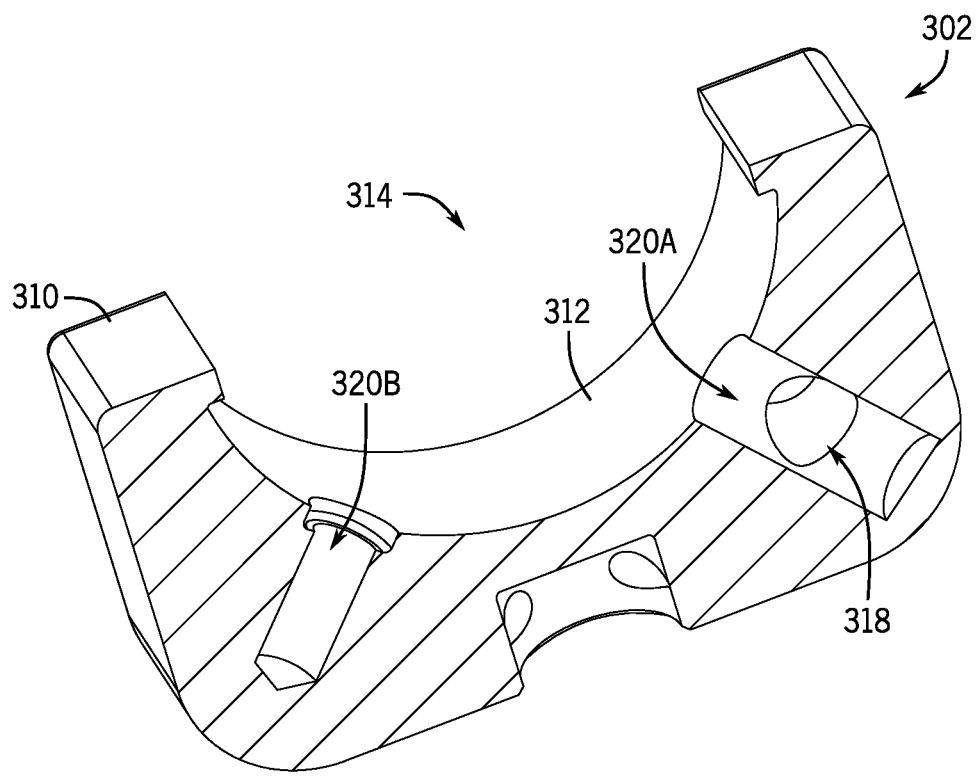
FIG. 14 is a cross-sectional isometric view of the ram head of FIG. 12 taken along line 14-14.

In the illustrated embodiment, the die release button 306 includes a single actuation portion 340; however, in other embodiments, a second actuation portion may be disposed at the other opposing end 332. Additionally, in the illustrated embodiment, the button body 330 is configured to extend at least partially through the ram head body 310. In particular, the release button hole 318 extends from one of the lateral surfaces 316 into the ram head body 310 and is configured as a blind hole, as shown in FIG. 14. However, in some embodiments, the release button hole 318 can extend fully between the lateral surfaces 316 through the ram head body 310 (see, for example, through hole 118 of the ram head 102 in FIG. 3) so that the die release button 306 can be actuated from both sides of the ram head 302.

Figure 15:
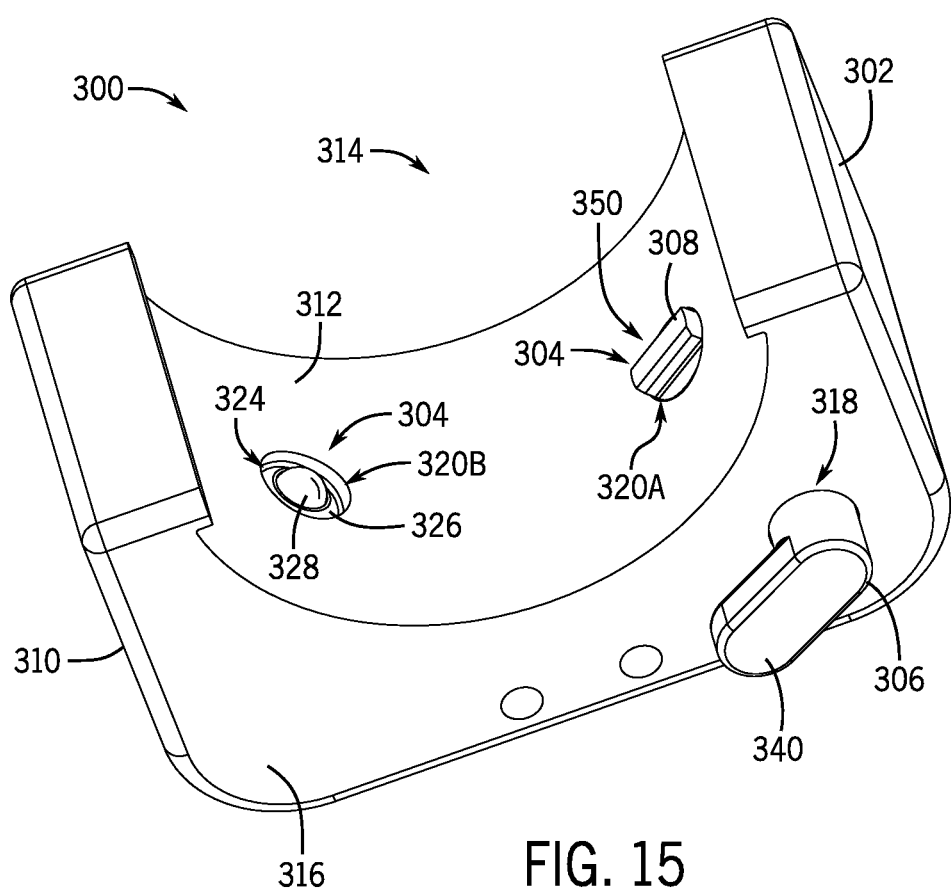
FIG. 15 is an isometric view of the die retainer of FIG. 12.

With continued reference to FIG. 14, the second pin cavity 320B of the ram head 302 extends into the ram head body 310 from the die engagement surface 312. The pin cavity 320B is configured to receive a pin 326 of the detent member 324. As illustrated in FIG. 15, the pin 326 of the detent member 324 is configured to support a detent ball 328 at least partially within the second pin cavity 320B. In particular, the pin 326 can support the detent ball 328 adjacent to the die engagement surface 312 so that the detent ball 328 extends partially within the die cavity 314 and partially within the pin cavity 320B. In some embodiments, the detent ball 328 may be fastened to the pin 326 by one or more of a fastener, adhesive, or friction fit, for example.

In general, the detent member 324 provides a catch within the ram head 302 that can resist motion of a die when the die is secured (or partially secured) in the die cavity 314. In use, the die pin 308 may be retracted into the ram head body 310 adjacent to the die engagement surface 312 in the die cavity 314 via the die release button 306. A die can then be inserted into the die cavity 314 to engage each of the die engagement surface 312 and the detent member 324 to provide a first locking engagement. The die release button 306 can then be released so the die engaging portion 350 of the die pin 308 can engage and secure a die in the die cavity 314 to provide a second locking engagement. In some embodiments, a die may be locked (e.g., snapped) into place within the die cavity 314 without retracting the die pin 308 via the die release button 306.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A die retainer for use in a tool with a die, the die retainer comprising:
   a ram head including a die engagement surface that defines a die cavity, a pair of lateral surfaces on opposing sides of the die cavity, a release button hole, and a die pin cavity that intersects the release button hole;
   a release button that extends through the release button hole, the release button including a pair of opposing ends, each one of which extends past one of the pair of lateral surfaces, the release button including a slot, the slot extending between a first slot end and a second slot end, the second slot end defining a notch, the notch having at least one sloped surface; and
   a die pin that extends through the die pin cavity, the die pin including a button engaging portion configured to move along the at least one sloped surface of the release button and a die engaging portion that extends past the die engagement surface of the ram head into the die cavity to retain the die.

2. The die retainer of claim 1, wherein the die pin extends through the slot of the release button so that the button engaging portion extends past the first slot end and the die engaging portion extends past the second slot end.

3. The die retainer of claim 1, wherein the ram head defines a second die pin cavity, and
   wherein a second die pin extends through the second die pin cavity and into the die cavity to retain the die.

4. The die retainer of claim 3, wherein the second die pin is a detent member having a detent ball that partially extends into the die cavity.

5. The die retainer of claim 1, wherein the release button is a first release button, and further comprising a second release button extending through the ram head and beyond each of the pair of lateral surfaces of the ram head.

6. The die retainer of claim 5, further comprising a first bridge element coupled to each of the first release button and the second release button adjacent to one of the pair of lateral surfaces and a second bridge element coupled to each of the first release button and the second release button adjacent to the other of the pair of lateral surfaces,
wherein each one of the first bridge element and the second bridge element is configured to receive an actuation force to release the die from the die cavity of the ram head.

7. The die retainer of claim 1, wherein the release button is dual acting and can be actuated from either of the pair of opposing ends of the release button to retract the die engaging portion from the die cavity.

8. The die retainer of claim 1, wherein the notch includes a symmetric profile.

9. The die retainer of claim 8, wherein the at least one sloped surface slopes away from the die cavity and is dimensioned to retract the die engaging portion from the die cavity as the button engaging portion moves toward one side of the symmetric profile in an axial direction of the release button.

10. The die retainer of claim 1, further comprising a biasing element configured to engage the die pin proximate to the button engaging portion and bias the die pin toward a retention orientation.

11. The die retainer of claim 10, wherein the biasing element is a spring seated within the pin cavity.

12. The retainer of claim 1, wherein the button engaging portion includes a stepped profile that is dimensioned to slidably secure the die pin within the slot.

* * * * *